(12) United States Patent
Wang et al.

(10) Patent No.: US 11,872,776 B2
(45) Date of Patent: Jan. 16, 2024

(54) METHODS FOR RECOVERING EXPANDED POLYMER TOOLING

(71) Applicant: The Boeing Company, Chicago, IL (US)

(72) Inventors: Xiaoxi Wang, Mukilteo, WA (US); Gary Ernest Georgeson, Tacoma, WA (US); Jonathan A. Santiago, Seattle, WA (US)

(73) Assignee: The Boeing Company, Arlington, VA (US)

( * ) Notice: Subject to any disclaimer, the term of this patent is extended or adjusted under 35 U.S.C. 154(b) by 314 days.

(21) Appl. No.: 16/721,614

(22) Filed: Dec. 19, 2019

(65) Prior Publication Data

US 2021/0187876 A1 Jun. 24, 2021

(51) Int. Cl.

| B29C 70/44 | (2006.01) |
|---|---|
| B29C 44/34 | (2006.01) |
| B29C 44/36 | (2006.01) |
| B29C 33/40 | (2006.01) |
| B29C 35/02 | (2006.01) |

(52) U.S. Cl.
CPC .............. B29C 70/44 (2013.01); B29C 33/40 (2013.01); B29C 35/02 (2013.01); B29C 44/3442 (2013.01); B29C 44/3461 (2013.01); B29C 44/36 (2013.01)

(58) Field of Classification Search
CPC .. B29C 44/3442; B29C 44/3461; B29C 44/36
See application file for complete search history.

(56) References Cited

U.S. PATENT DOCUMENTS

| 3,755,031 A | 8/1973 | Hoffman et al. |
| 3,865,629 A * | 2/1975 | Dankoff .............. B23Q 11/1069 |
| | | 134/40 |
| 4,302,549 A | 11/1981 | Crowley |
| 4,303,756 A | 12/1981 | Kajimura et al. |
| 4,782,098 A | 11/1988 | Allen et al. |
| 5,051,224 A | 9/1991 | Donatelli et al. |
| 5,102,604 A | 4/1992 | Sidles et al. |

(Continued)

FOREIGN PATENT DOCUMENTS

| CN | 101186084 A | 5/2008 |
| CN | 105637021 | 6/2016 |

(Continued)

OTHER PUBLICATIONS

Praller, Andreas, "Foaming Plastics with Inert Gases", Kunststoffe Plast Europe, Jun. 2005, 4 pages.

(Continued)

*Primary Examiner* — Christopher T Schatz
(74) *Attorney, Agent, or Firm* — Kolisch Hartwell, P.C.

(57) ABSTRACT

Methods of recovering and/or recycling expanded polymer tooling, the methods including collecting expanded polymer tooling, reducing the collected expanded polymer tooling into smaller particles, treating the reduced expanded polymer tooling in order to yield an at least partially purified recovered polymer composition, and then collecting the at least partially purified recovered polymer composition. The at least partially purified recovered polymer composition can then be used to form new expandable polymer tooling.

12 Claims, 5 Drawing Sheets

(56) References Cited

U.S. PATENT DOCUMENTS

| | | |
|---|---|---|
| 5,230,844 A | 7/1993 | Macaire et al. |
| 5,273,696 A | 12/1993 | Cazaillon et al. |
| 6,117,376 A | 9/2000 | Merkel |
| 7,052,572 B2 | 5/2006 | Miura et al. |
| 8,540,921 B2 | 9/2013 | Senibi et al. |
| 8,790,565 B2 | 7/2014 | Miller |
| 11,298,892 B2 | 4/2022 | Santiago et al. |
| 11,325,282 B2 | 5/2022 | Wang et al. |
| 2005/0027555 A1 | 2/2005 | Forrest et al. |
| 2006/0175730 A1 | 8/2006 | Merkel |
| 2007/0080481 A1 | 4/2007 | Kismarton |
| 2008/0111024 A1 | 5/2008 | Lee et al. |
| 2008/0249199 A1* | 10/2008 | Nising .............. C08J 3/12 521/40 |
| 2009/0078826 A1 | 3/2009 | Haensch et al. |
| 2010/0140842 A1 | 6/2010 | Nelson et al. |
| 2011/0308711 A1 | 12/2011 | Coleman et al. |
| 2012/0041086 A1 | 2/2012 | Sampath et al. |
| 2013/0134621 A1 | 5/2013 | Tsotsis et al. |
| 2014/0299257 A1 | 10/2014 | Pearson et al. |
| 2015/0166270 A1* | 6/2015 | Buscher .............. B29C 44/3442 406/48 |
| 2016/0121524 A1* | 5/2016 | Däschlein .............. B29B 9/12 264/54 |
| 2018/0208731 A1* | 7/2018 | Vankayala .............. C08J 9/0061 |
| 2020/0039156 A1 | 2/2020 | Wang et al. |
| 2020/0148851 A1 | 5/2020 | Queiroz Da Fonseca et al. |
| 2020/0207033 A1 | 7/2020 | Wang et al. |
| 2021/0001519 A1 | 1/2021 | Wang et al. |
| 2021/0001571 A1 | 1/2021 | Santiago et al. |
| 2022/0234309 A1 | 7/2022 | Santiago et al. |

FOREIGN PATENT DOCUMENTS

| | | |
|---|---|---|
| EP | 1391281 A1 | 2/2004 |
| EP | 2918388 A1 | 9/2015 |
| GB | 2259667 A | 3/1993 |
| JP | H11300740 A | 11/1999 |
| JP | 2003089728 A | 3/2003 |
| JP | 2006028373 A | 2/2006 |
| JP | 2007090345 A | 4/2007 |
| JP | 3981299 B2 | 9/2007 |
| WO | 2013111368 A1 | 8/2013 |
| WO | 2019073848 A1 | 4/2019 |
| WO | 2019129686 A1 | 7/2019 |

OTHER PUBLICATIONS

The Linde Group, "Facts About. Foaming Plastics with Inert Gases", Linde North America, Inc. Brochure, 2012, 12 pages.

Akzo Nobel NV, Expancel Microspheres: The World's Favorite Secret Ingredient, 2016, 16 pages.

Akzo Nobel NV, Product Specification for Expancel Microspheres, Expancel MB, Nov. 2017, 2 pages.

Easy Composite Ltd., Beginner's Guide to Out of Autoclave Carbon Fibre, downloaded from Internet on May 5, 2019, at https://www.easycomposites.co.uk/downloads/TDS/EC-TDS-Beginners-Guide-to-Prepreg-Carbon-Fibre.pdf, 21 pages.

European Patent Office, Partial European Search Report regarding European Patent Application No. 20215427.4, dated May 14, 2021, 13 pages.

U.S. Patent and Trademark Office, Non-Final Office Action regarding U.S. Appl. No. 16/053,733, dated Sep. 3, 2020, 20 pages.

U.S. Patent and Trademark Office, Final Office Action regarding U.S. Appl. No. 16/053,733, dated Dec. 16, 2020, 14 pages.

U.S. Patent and Trademark Office, Non-Final Office Action regarding U.S. Appl. No. 16/459,492, dated Jun. 15, 2021, 37 pages.

European Patent Office, Extended European Search Report regarding European Patent Application No. 20215427.4, dated Aug. 27, 2021, 12 pages.

U.S. Patent and Trademark Office, Non-Final Office Action regarding U.S. Appl. No. 16/459,505, dated Sep. 2, 2021, 37 pages.

U.S. Patent and Trademark Office, Non-Final Office Action regarding U.S. Appl. No. 17/718,222, dated Oct. 5, 2022, 11 pages.

China National Intellectual Property Administration, First Office Action regarding Chinese Patent Application Serial No. 202011501300.X, dated Aug. 5, 2023, 6 pages.

* cited by examiner

METHODS FOR RECOVERING EXPANDED POLYMER TOOLING

CROSS-REFERENCE TO RELATED APPLICATIONS

The present application hereby incorporates by reference, for all purposes, the following U.S. patent applications: application Ser. No. 16/053,733, filed Aug. 2, 2018 by The Boeing Company and issued as U.S. Pat. No. 11,046,027 on Jun. 29, 2021; application Ser. No. 16/459,492, filed Jul. 1, 2019 by The Boeing Company and issued as U.S. Pat. No. 11,298,892 on Apr. 12, 2022; and application Ser. No. 16/459,505, filed Jul. 1, 2019 by The Boeing Company and issued as U.S. Pat. No. 11,325,282 on May 10, 2022.

FIELD

This disclosure relates to systems and methods for recycling expandable pellets used in manufacturing. More specifically, the disclosed examples relate to recovering the polymer materials that form the expandable pellets after their expansion, so that the recovered polymer materials may be used to manufacture new expandable pellets.

INTRODUCTION

Engineered composite materials are used in many applications, particularly where the composite material can be made stronger, lighter, and/or less expensively than a traditional material. A variety of modern composite materials exist, but the most common are varieties of fiber-reinforced polymer composites, such as fiberglass or carbon fiber composites.

For many composite materials, the manufacturing process includes curing the fiber-reinforced matrix material, typically under elevated temperatures and pressures. An industrial autoclave is often used for curing composite materials, as autoclaves permit the application of both temperature and pressure under controlled conditions.

Unfortunately, for processes that require autoclave treatment, a bottleneck may be created in the manufacturing process, with throughput dependent upon the capacity of the autoclaves available, and requiring transport of either raw materials or preassembled but uncured components to the autoclave, and subsequent transport of the cured components from the autoclave to where they will be utilized.

So-called "Out of Autoclave" composite manufacturing (or OOA manufacturing) provides an alternative to traditional industrial curing processes typically used for composite manufacture. An ideal OOA curing process would achieve the same quality of composite component as an industrial autoclave, without requiring treatment within a traditional autoclave.

In some examples, OOA composite manufacturing may include the addition of an expandable polymer element to a constraining volume that contains an uncured composite workpiece, so that when the expandable polymer element is expanded, sufficient pressure can be applied to the workpiece as it cures to facilitate on-site manufacture of composite materials. After expansion, however, the polymer element represents a useful resource for the preparation of additional expandable polymer elements, or other polymer-based items.

SUMMARY

The present disclosure provides methods relating to recovering and/or recycling expanded polymer tooling used for curing composite materials.

In some examples, the present disclosure relates to methods for recycling an expanded polymer composition that includes collecting the expanded polymer composition, reducing the collected expanded polymer composition to smaller particles, treating the reduced expanded polymer composition to yield an at least partially purified recovered polymer composition, and collecting the at least partially purified recovered polymer composition.

In some examples, the present disclosure relates to methods of recycling expandable tooling, where the tooling includes foamed polymer pellets, the method including expanding the foamed polymer pellets within a constraining container in order to apply pressure to a workpiece, collecting the expanded polymer pellets from the constraining container, reducing the collected expanded polymer pellets into smaller particles, treating the reduced polymer pellets to yield an at least partially purified polymer composition, collecting the at least partially purified polymer composition, and forming recovered-polymer pellets using the at least partially purified polymer composition.

In some examples, the present disclosure relates to methods for recycling expandable tooling that includes expandable polymer pellets, the method including expanding the expandable polymer pellets within a constraining container to apply pressure to a workpiece, collecting the expanded polymer pellets from the constraining container, moving the collected expanded pellets into a reducing apparatus using a directed fluid flow, reducing the collected expanded polymer pellets into smaller particles using the reducing apparatus, removing an amount of at least one foaming agent from the reduced polymer pellets by one or more processes of heating, degassing, solvent cleaning, and phase separation to yield an at least partially purified polymer composition, feeding the at least partially purified polymer composition into an extruding apparatus, and forming recovered-polymer pellets from the at least partially purified polymer composition.

Features, functions, and advantages can be achieved independently in various examples of the present disclosure, or can be combined in yet other examples, further details of which can be seen with reference to the following description and drawings.

DETAILED DESCRIPTION

Figure 1:
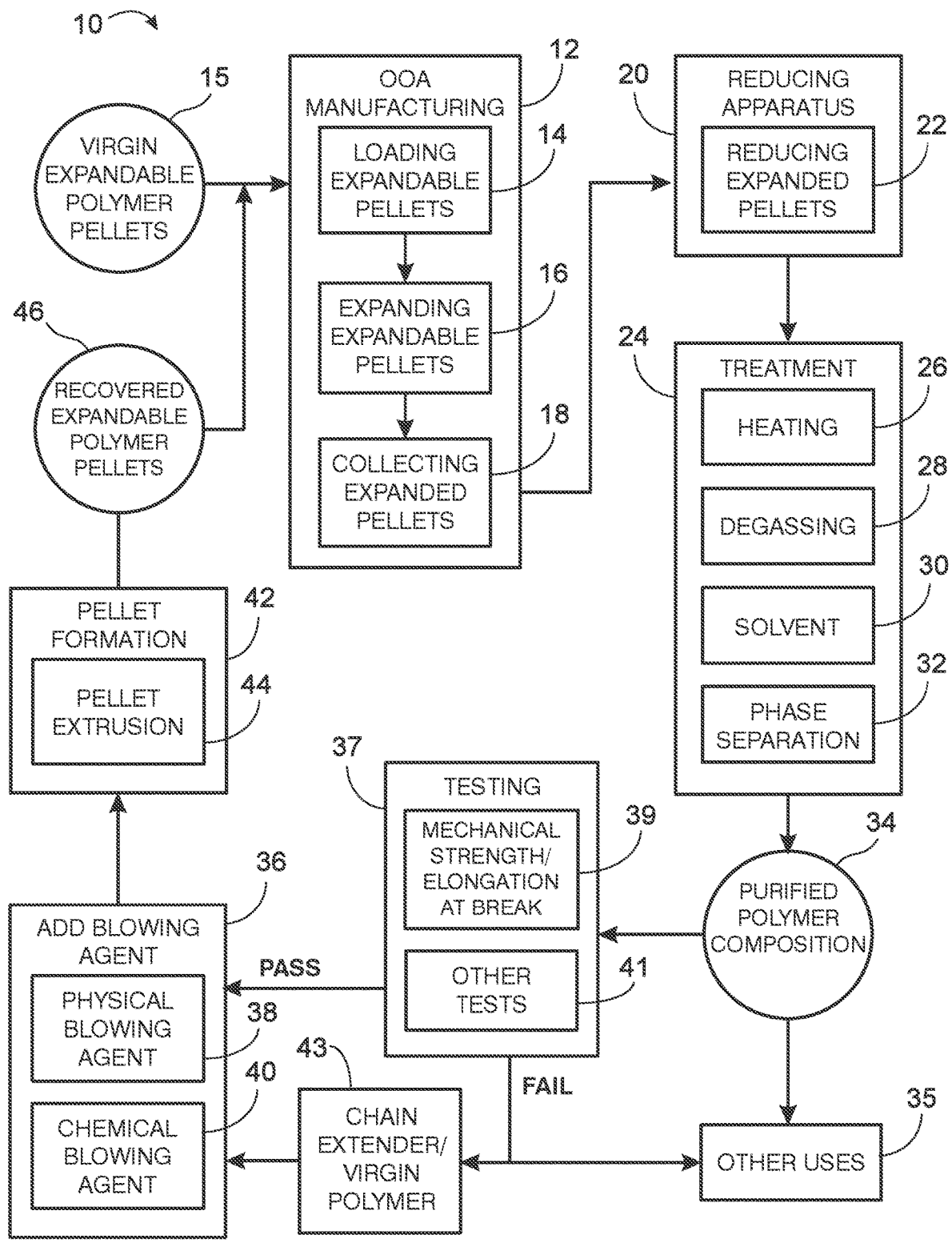
FIG. 1 is a schematic diagram depicting steps of an illustrative manufacturing process utilizing expanding tooling, including recovery and/or reuse of polymer compositions used in the expanding tooling.

Various aspects and examples of methods for recovering and/or recycling expanded polymer tooling are described below and illustrated in the associated drawings. Unless otherwise specified, methods of recovering and/or recycling expanded polymer tooling, their individual steps and variations may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein may be included in other similar devices and methods, including being interchangeable between disclosed examples. The following description of various examples is merely illustrative in nature and is in no way intended to limit the examples, their applications, or their uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion.

Definitions

The following definitions apply herein, unless otherwise indicated.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, in the order they are introduced in a particular context and are not intended to show serial or numerical limitation, or be fixed identifiers for the group members.

"Coupled" means to be in such relation that the performance of one influences the performance of the other, may include being connected, either permanently or releasably, whether directly or indirectly through intervening components, and is not necessarily limited to physical connection(s).

"Expandable" means able to be expanded, or having the potential or capability of increasing in size and/or volume. A substance or discrete element that is expandable may be capable of increasing in size or volume symmetrically, or asymmetrically. Where the expandable substance is capable of symmetric expansion, the substance undergoes an a substantially equivalent degree of expansion along each axis. Where the expandable substance exhibits asymmetric expansion, the substance can undergo a greater relative expansion along a first axis, or first and second axes, than along a different axis.

Overview

An expandable tooling system may be employed for selected out-of-autoclave composite manufacturing processes. The expandable tooling system can include one or more expandable elements that are used to apply positive pressure to a composite workpiece during the process of curing the workpiece, without requiring the use of an autoclave.

The expandable element can be configured to expand when a predetermined change is produced in the expandable element, typically a change in a physical property or chemical property of the expandable element. Unless otherwise specified, expansion of the expandable element refers to an increase in the volume of the expandable element, surface area of the expandable element, and/or spatial extent of the expandable element in one or more dimensions. In one example, the expandable element can be configured to expand when the temperature of the element is raised from a lower temperature, such as an ambient temperature, to a predetermined higher temperature.

The out-of-autoclave curing process can be simplified and facilitated where the expandable element includes a plurality of expandable pellets, where the expandable pellets are configured to undergo volumetric expansion when heated to at least the predetermined temperature. The expandable element can comprise one or more expandable pellets (also called expandable beads) each configured to expand (e.g., to a predetermined volume) when heated to a predetermined temperature. For example, the composition of the expandable pellets can be designed to achieve a desired relationship between the volume of each expandable pellet and the temperature of the expandable pellet as a function of time.

The expandable element can take any suitable form, without limitation. The expandable element can be added to a constraining container, for example, as a powder or a foam. Alternatively, or in addition, the expandable element can be added to the constraining container as discrete portions of a solid or semi-solid, such as layers of an expandable element which can be draped across a workpiece assembly, or as smaller portions such as pellets, or beads. Where the expandable element is used in the form of smaller solid or semi-solid portions, the expandable element can be added to the constraining container in sacks or bags of pellets, beads, or other smaller portions. Most typically, the expandable element is used in the form of a plurality of expandable pellets.

In one aspect, the expandable pellets are formed from a polymer composition and are configured to foam, and thereby expand, when heated to at least a predetermined foaming temperature. These expandable pellets may include a foamable material, such as a polymer composition that has been treated with a blowing agent.

The expandable element can include a polymer composition that is a thermoplastic polymer composition. Thermoplastic polymers include a family of plastic polymers that is capable of softening when heated. When heated above their glass transition temperature and below their melting point, a solid thermoplastic material softens, becoming pliable or even transforming into a viscous liquid. In this state, thermoplastic compositions can be expanded by the action of an appropriate foaming agent.

Because thermoplastic materials can be softened and reshaped, such thermoplastic compositions lend themselves to being recovered, optionally purified, and reshaped into a new material. Alternatively or in addition, the new material can be another thermally-expandable pellet that is suitable for use as expandable tooling for out-of-autoclave manufacturing methods.

A variety of types of suitable thermoplastic compositions are known, including acrylic polymers, acrylonitrile butadiene styrene (ABS) polymers, nylon polymers, polylactic acid (PLA) polymers, polybenzimidazole polymers, polycarbonate polymers, polyether sulfone (PES) polymers, polyetherimide (PEI) polymers, polyethylene (PE) polymers, polyphenylene oxide (PPO) polymers, polyphenylene sulfide (PPS) polymers, polyvinyl chloride (PVC) polymers, polyvinylidene fluoride (PVDF) polymers, and polytetrafluoroethylene (PTFE) polymers, among others.

Acrylonitrile butadiene styrene (ABS) polymers, in particular, exhibit physical properties that render them highly compatible with their use in expandable tooling for out-of-autoclave tooling systems. ABS is amorphous in structure, and therefore does not exhibit a sharp melting point. The glass transition temperature (softening point) for ABS is approximately 105° C. (221° F.), a temperature that is readily attainable. Polymer materials made of ABS polymers are tough and impact-resistant, and the polymer itself is highly stable. ABS is also highly compatible with extrusion manufacturing processes. Expandable thermoplastic pellets typically include a blowing agent that is selected such that when the pellet is heated to at least a predetermined temperature, the blowing agent expands to form a plurality of pockets, or voids within the softened thermoplastic composition, such that the volume of the pellet increases. Any substance capable of producing the desired degree of expansion in the thermoplastic pellets is an appropriate blowing agent. The appropriate blowing agent may be applied to the thermoplastic pellet prior to heating.

An appropriate blowing agent can be a physical blowing agent, such as for example a suitable inert gas or liquid. Suitable physical blowing agents can include carbon dioxide, nitrogen, hydrocarbons, chlorofluorocarbons, hydrochlorofluorocarbons, or a supercritical gas such as liquid $CO_2$, among others. Any physical blowing agent that can permeate into thermoplastic pellet under applied pressure, and that will expand in a plurality of locations within the thermoplastic pellets when the temperature of the pellet is increased from an ambient or initial temperature to a predetermined higher temperature, is an appropriate blowing agent.

Alternatively or in addition, the blowing agent may include a chemical blowing agent that is selected to chemically react with one or more components of the expandable pellets, such as isocyanate and water for polyurethane, azodicarbonamide for vinyl, hydrazine and other nitrogen-based materials for thermoplastic and elastomeric foams, and sodium bicarbonate for thermoplastic foams, among others.

Alternatively, or in addition, the blowing agent can comprise one or more expandable gas-filled microspheres that are embedded within the thermoplastic pellet when it is initially formed. Suitable microspheres can include expandable thermoplastic microspheres sold by AkzoNobel, Inc. of Chicago, Illinois under the proprietary name EXPANCEL.

Alternatively, or in addition, the expandable thermoplastic pellets can include a blowing agent that is or includes a foaming agent. A suitable foaming agent can be any material that facilitates formation of a foam, such as for example, a surfactant. Suitable foaming agents can include sodium lauryl ether sulfate (SLES), sodium lauryl sulfate (also known as sodium dodecyl sulfate or SDS), and ammonium lauryl sulfate (ALS), among other surfactants that are well-known and commercially available.

During use in an out-of-autoclave composite manufacturing process, expandable thermoplastic pellets can be used to apply positive pressure to a composite workpiece during the process of curing the workpiece. Typically, but not exclusively, the uncured composite workpiece will be disposed upon, or supported by, a rigid form which, in turn, is placed within an internal volume of a constraining container. A plurality of expandable pellets can be added to the internal volume of the constraining container so that they are at least proximate to the uncured composite workpiece, and on the opposing side from the rigid form.

Prior to and/or during the curing process, the unexpanded pellets are caused to expand such that pressure is applied to the interior surfaces of the constraining container, as well as the surface of the uncured composite workpiece. The expanded pellets typically apply pressure resulting from the expansion of the pellets to the composite workpiece during some or all of the curing process to facilitate consolidation. After the part has been cured, the expanded pellets can be removed from the constraining container prior to, simultaneously with, or after the cured composite workpiece is removed from the constraining container.

Although expanded thermoplastic pellets are typically readily removed from a constraining container after a workpiece has been cured, in some examples the expanded thermoplastic pellets can remain expanded and tightly packed together within the container, which can impede their removal from the container. The expandable thermoplastic pellets can therefore be additionally configured in one or more ways to be more easily separated from the cured workpiece, the rigid form, and/or the inner surfaces of the constraining container.

For example, the expandable thermoplastic pellets can be modified so as to minimize sintering (self-adhesion) upon heating and expansion. Alternatively, or in addition, the expandable thermoplastic pellets can be configured to minimize potential adhesion with the surfaces of the container and workpiece assembly, such as by coating the pellets with a suitable agent configured to prevent adhesion and facilitate separation of the expanded pellets from each other and/or from the constraining container after heating.

A suitable agent for minimizing adhesion can include a lubricating agent. A suitable lubricating agent is one that does not interfere with curing of the workpiece, and prevents the expanded thermoplastic pellets from substantially adhering to one another, to the container, or to the components of a workpiece assembly. Suitable lubricating agents can include liquids, powders, or combinations thereof. When added as a powder, a suitable lubricating agent can comprise a nano-powder. Alternatively, or in addition, suitable lubricating agents can include silicon-based materials, fluorinated polymers, or other substantially inert substances. For example, a suitable lubricating agent can include polytetrafluoroethylene (PTFE) powder, PTFE nano-powder, silicone, perfluoropolyether (PFPE), perfluoroalkylether (PFAE), perfluoropolyalkylether (PFPAE), and/or the like. Such a lubricant can be applied to the expandable thermoplastic pellets before the expandable pellets are inserted into the constraining container. Alternatively, or additionally, a suitable lubricant can be applied to the expandable thermoplastic pellets while they are disposed inside the constraining container. Coating at least some of the expandable pellets with a suitable lubricant can include mixing the lubricant with the plurality of pellets and/or pouring the lubricant over the plurality of pellets. Additionally, or alternatively, at least a subset of the plurality of the expandable thermoplastic pellets can be coated with a desired lubricant and then mixed in with a plurality of uncoated pellets. The presence of one or more lubricants may additionally complicate a process of recovering and/or reusing the thermoplastic composition used to prepare the expandable thermoplastic pellets.

As regions of crystallinity and/or semi-crystallinity along the outer surfaces of the expandable pellets can help to prevent the pellets from sintering to each other, at least some of the expandable pellets can be configured, such as by preprocessing, to have regions of crystallinity along outer surfaces of the pellets, such that adding the thermally-activated expandable pellets includes adding a plurality of expandable pellets having surface regions of increased crystallinity in order to decrease adhesion between pellets before and/or after volumetric expansion of the expandable pellets. The introduction of regions of crystallinity and/or semi-crystallinity in or on the expandable thermoplastic pellets should not substantially interfere with recovery and/or reuse of the thermoplastic composition used to form the pellets.

Although the content of residual blowing agent, foaming agent, and/or lubricating agent in expanded polymer pellets may be low, when the polymer composition is used to form new expandable pellets, the presence of additional chemicals may have an impact on the physical and/or chemical behavior of the polymer composition. The residual compounds might alter the properties of the polymer composition in ways that compromise the extrusion process used to form new polymer pellets, or might be incompatible with the extrusion apparatus itself. The presence of blowing agent, foaming agent, or lubricating agent may additionally complicate the combination of recovered polymer compositions with virgin polymers.

The methods of the present disclosure facilitate the recovery, at least partial purification, and reuse of polymer compositions used to prepare expandable tooling for selected out-of-autoclave composite manufacturing techniques. Various aspects of the present methods will be discussed with reference to the schematic chart of FIG. 1.

Although the present methods will discuss and refer to expandable tooling that includes a plurality of expandable polymer pellets, any form of polymeric composition that is appropriately-sized and configured to undergo expansion and to facilitate out-of-autoclave manufacturing is a suitable composition for the purposes of the present disclosure, without limitation.

An out-of-autoclave composite manufacturing process that employs expandable tooling, as described above, is represented by process 12. Manufacturing process 12 can include loading expandable polymer pellets into a constraining container, at 14.

The expandable polymer pellets employed for manufacturing process 12 can be or can include expandable polymer pellets prepared from one or more polymeric compositions that are not recovered or recycled, or virgin polymeric compositions 15, as shown in FIG. 1.

Manufacturing process 12 can further include causing the expandable polymeric composition to expand at 16, for example by heating the expandable polymeric composition to above a determined temperature at which expansion of the polymeric composition will take place. Once the manufacturing process is complete, the now expanded polymer pellets can be collected, at 18, for recovery of the polymer composition used to form the pellets.

The collected and expanded polymer composition pellets are transported to a reducing apparatus 20. Due to the lightweight nature of the expanded pellets, delivery to reducing apparatus 20 can be facilitated by carrying the expanded pellets in a directed flow of a transport fluid. Any fluid capable of transporting expanded polymer pellets to reducing apparatus 20 is an appropriate fluid for the purposes of this disclosure, including fluids that are liquid or gas.

Where the fluid used to transport the collected expanded polymer pellets is a directed gas flow, the gas can be used to blow the collected pellets to the reducing apparatus, either by transporting the collected pellets by impelling them with a compressed gas flow, or by applying a vacuum to create a pellet-carrying fluid gas flow.

Reducing apparatus 20 can include any mechanism capable of reducing the size of solid polymer materials into smaller polymer particles such as by grinding, crushing, or cutting. Reducing apparatus 20 can include a grinder, a mill, or chopping machinery. Reducing apparatus 20 can optionally include a sizing filter to ensure that particles of the expanded polymer pellets do not exit reducing apparatus 20 until reduced to a desired and sufficiently small particle size. Reducing apparatus 20 typically includes a grinding apparatus.

Once the expanded polymer pellets are sufficiently reduced in particle size, as indicated at 22 of FIG. 1, the reduced polymer particles are subjected to one or more purification treatments 24.

Purification treatments 24 can be used to remove one or more blowing agents added to the polymer composition in order to facilitate expansion of the polymer pellets. As discussed above, selected blowing agents can include physical blowing agents, or chemical blowing agents, or a combination thereof. Furthermore, the polymer pellets may incorporate a blowing agent that is or includes a foaming agent, such as a surfactant. The purification treatments 24 can optionally and/or additionally be used to remove one or more lubricating agents intended to prevent sintering of the pellets upon heating.

Where the reduced polymer particles include a physical blowing agent that includes a gas or liquid configured to undergo expansion when heated, the reduced polymer particles can be subject to purification treatment that includes heating the polymer particles, shown at 26. Where the blowing agent of interest is sufficiently volatile, such as gases or low-boiling solvents, heating the polymer particles can drive the volatile blowing agent(s) from the polymer composition without the application of a vacuum. Where the polymer composition is a thermoplastic polymer, in particular, heating the polymer particles above the glass transition temperature of that polymer can result in softening of the polymer, similar to melting, which can facilitate removal of the blowing agent.

Where the reduced polymer particles undergo heating to soften the polymer composition of the particles, the reduced polymer particles are typically heated to a temperature above the glass transition temperature of that polymer. The glass transition temperature for amorphous polymers can vary substantially, but in most instances will be above 80° C. (176° F.), above 100° C. (212° F.), above 150° C. (302° F.), or even above 200° C. (392° F.).

Additionally, or in the alternative, the purification treatment 24 can include degassing, as shown at 28. Degassing can include applying a vacuum to the reduced polymer particles so that blowing agents incorporated in the polymer composition that are sufficiently volatile can be removed. Typically, but not exclusively, the efficacy of heating 26 and degassing 28 may be enhanced by a combination of the procedures. That is, by heating the polymer particles followed by, or at the same time as, applying a vacuum to the polymer composition. During degassing a sufficient vacuum is applied to the polymer composition that the gases and/or liquids to be removed have their boiling points reduced to an evaporation temperature that is below the process temperature of the degassing process. A vacuum is applied to the polymer composition for a time sufficient that a desired amount of the blowing agent of interest is removed from the polymer composition. The combination of heating and applied vacuum can be capable of removing blowing agents that are less volatile blowing agents.

The vacuum applied to the reduced polymer particles can vary depending upon the pump system used to generate the vacuum. For example, a simple water aspirator may generate a vacuum of approximately 3 kPa (0.5 psi), while a mechanical vacuum pump may generate a vacuum of approximately 13 Pa ($1.9 \times 10^{-3}$ psi) for a single-stage pump, to approximately 0.13 Pa ($1.9 \times 10^{-4}$ psi) for a double-stage pump.

Additionally, or in the alternative, the reduced polymer particles can be subject to purification treatment that includes treating the reduced polymer particles with an appropriate solvent, as shown at 30. The selection of an organic (or nonpolar) solvent can result in at least a softening of the polymer composition making up the reduced polymer particles, if not partial or complete dissolution of the polymer composition. By softening and/or dissolving the polymer composition in solvent, the blowing agent or agents present in the polymer may be more readily removed.

Additionally, or in the alternative, the reduced polymer particles can be subject to purification treatment that includes phase separation, as shown at 32. Phase separation typically includes treating the material to be purified with a combination of two immiscible liquids. For example, the reduced polymer particles can be softened and/or dissolved in an organic (nonpolar) solvent, which can then be extracted one or more times by a substantially immiscible polar solvent, such as water. During the extraction process, the nonpolar polymer composition will remain substantially associated with the organic solvent, while those blowing agents that are or include highly polar substances will preferentially migrate to the polar solvent.

For example, where a blowing agent includes a surfactant foaming agent, the surfactant may possess one or more ionic side chains that help confer amphiphilic properties on the surfactant. Phase separation of polymer particles that include ionic surfactant foaming agents may result in the surfactant being preferentially extracted into the polar solvent. Alternatively, or in addition, phase separation may be useful in removing unreacted chemical blowing agent, or the reaction products of the reaction of a chemical blowing agent, among other impurities.

Where the blowing agent includes a surfactant foaming agent, the loading of foaming agent into the polymer composition may be low enough that the polymer composition may be reclaimed and reused a plurality of times without having to remove residual surfactant foaming agent.

Any or all of the purification treatments may be used singly or in combination with the other purification treatments 24. For example, the reduced polymer particles may be heated to the point of softening (heating 26), exposed to a vacuum while heated (degassing 28), following by dissolution/softening in solvent (30) and phase separation (32) of the resulting solution.

Purification treatment 24 is optionally followed by removal of the organic solvent and/or polar solvent used, for example by heating and/or applying reduced pressure, so as to produce an at least partially purified polymer composition 34.

At least partially purified polymer composition 34 is at least partially purified with respect to the composition of the reduced polymer particles prior to purification treatment 24. More specifically, the at least partially purified polymer composition 34 includes a smaller amount of at least one blowing agent present in the reduced polymer particles produced by reducing the expanded polymer pellets at 22 of scheme 10. The at least partially purified polymer composition 34 may include a smaller amount of each blowing agent originally present in the polymer composition. In a particular aspect of purification treatment 24, the purification treatment removes substantially all of each blowing agent originally present in the reduced polymer particles.

At least partially purified polymer composition 34 may be employed in any suitable subsequent use 35, where such use is compatible with the properties of polymer composition 34. Where polymer composition 34 includes thermoplastic polymers, in particular, at least partially purified polymer composition 34 may be used to form construction materials, synthetic wood products, furnishings, product containers, and a variety of other substances. For example, the polymer composition 34 may be suitable for injection molding processes, or any other manufacturing technique that employs polymeric materials, without limitation.

Prior to employing at least partially purified polymer composition 34 in the manufacture of additional expandable polymer pellets, the physical properties of at least partially purified polymer composition 34 can be evaluated by one or more testing procedures 37. For example, after the purification treatment 24 an amount of the resulting purified polymer composition 34 can be diverted to a testing chamber to undergo evaluation and testing, at 37.

Any testing procedure generally useful for evaluating the chemical and/or physical properties of a polymer composition may be used in testing at least partially purified polymer composition 34. For the purpose of evaluating whether the purified polymer composition is suitable for use in manufacturing additional expandable polymer pellets, testing procedures 37 can include evaluating a mechanical strength of the polymer composition at 39, for example by evaluating/measuring an elongation at break of the polymer composition also known as fracture strain or tensile elongation at break. Alternatively, or in addition, any of a variety of other appropriate tests may be used to characterize the properties of the partially purified polymer compositions, at 41.

The recovered polymer composition can be injection-molded to form a desired shape (such as a dog bone shape) that is suitable for evaluating tensile strength and/or elongation at break (see the procedure set out at ASTM D4894). If the test results meet the established criteria (such as for example a measured elongation at break that is higher than 200%), the recovered polymer composition can then be loaded with foaming agent and reused. If the results fail to meet the established criteria, the recovered polymer composition can be modified in order to improve the physical and mechanical properties of the composition, such as by adding a polymer chain-extending additive, the addition of an amount of virgin polymer composition, or both at 43 of scheme 10. Typically an amount of chain extender and/or virgin polymer composition can be added that is sufficient to result in a polymer composition that possesses the desired mechanical properties and will be useful for subsequent expandable polymer pellet manufacture. The testing/modification process can be optimized by developing a sampling plan in which the testing frequency can be determined by the historical failure rate and statistical data.

Where it is desirable for polymer composition 34 to be reused to prepare expandable polymer pellets for subsequent and repeated use in manufacturing process 12, a blowing agent can be added to polymer composition 34 at 36 of scheme 10. Any suitable blowing agent may be used to create an expandable polymer composition, including one or more physical blowing agents at 38 and/or one or more chemical blowing agents at 40.

As discussed above, where a physical blowing agent is added to a polymer composition, as at 38, the physical blowing agent may be a gas or liquid selected to permeate into the polymer pellet under applied pressure, such that it will expand when the temperature of the resulting pellet is increased to a predetermined higher temperature. For example, in the case of a PET polymer composition, solid extruded PET pellets can be placed in a pressure vessel, and a high pressure of $CO_2$ can be applied (such as 2 MPa of $CP_2$ for approximately 8 hours, or 5 MPa of $CO_2$ can be applied for approximately 2 hours. Alternatively, or in addition, where a chemical blowing agent is added to a polymer composition, as at 40, the chemical blowing agent is selected chemically react with one or more components present in, or added to, the expandable pellets.

After the addition of a desired blowing agent at 36, the resulting polymer composition can undergo pellet formation at 42, which may include feeding the polymer composition to an extruding machine, as shown at 44, in order to form expandable polymer pellets from the recovered polymeric composition having the desired size and shape for use in manufacturing process 12. The recovered expandable polymer pellets, shown at 46, may be used alone in manufacturing process 12, or they may be combined with previously unused expandable pellets including virgin polymeric compositions 15, in any desired ratio, as the addition of virgin polymer to the recovered polymer composition may be beneficial to the properties of the resulting polymer compositions.

Examples, Components, and Alternatives

The following sections describe selected aspects of exemplary methods of recycling polymer compositions used for expandable tooling. The examples in these sections are intended for illustration and should not be interpreted as limiting the entire scope of the present disclosure. Each section can include one or more distinct embodiments or examples, and/or contextual or related information, function, and/or structure.

Where the present disclosure provides flowcharts illustrating steps performed in illustrative methods, it should be understood that additional steps can be performed, without departing from the spirit of the disclosure or the present claims. Although various steps of the disclosed flowcharts are described below and depicted in the associated drawings, such steps need not necessarily all be performed, and in some cases can be performed simultaneously or in a different order than the order shown in the respective flowcharts.

A. Recovery of an Expanded Polymer Composition Incorporating a Physical Blowing Agent This section describes steps of an illustrative method for at least partially purifying an expanded polymer composition that incorporates a volatile physical blowing agent, such as carbon dioxide, nitrogen, etc., but does not incorporate any residual chemical blowing agents or lubricating agents. This process is generally applicable for thermoplastic polymer compositions, and more particularly for pellets having a composition including polyethylene terephthalate (PET).

Figure 2:
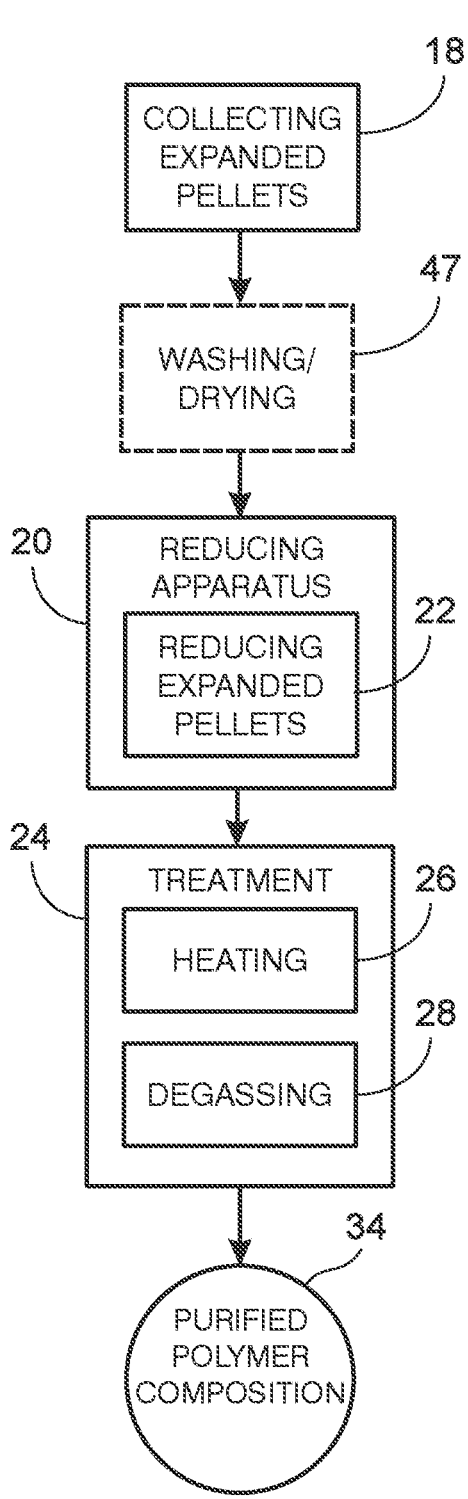
FIG. 2 is a schematic diagram depicting steps of an illustrative recovery process for selected polymer compositions used in expanding tooling.

As shown in FIG. 2, once the foamed PET pellets have been used in tooling manufacture, the now expanded PET pellets can be collected, at 18, for recovery of their polymer composition.

The expanded PET pellets are optionally washed and dried at 47 in order to remove contaminants that may have been collected during their use as manufacturing tooling. The expanded pellets can be rinsed, for example, by aqueous detergent mixtures, where the detergent can be any suitable surfactant, such as an alkali detergent (for example alkyl ethoxy sulfate (AES)), or a suitable alkyl sulfate detergent (AS). After washing, the clean PET pellets can be dried using hot air.

Where the expanded PET pellets contain fillers, such as steel beads for example, it can be advantageous to separate the filler materials before the pellets are reduced. Using FT-NIR or Raman emission spectroscopic detectors can permit such fillers to be removed, for example by taking advantage of the fillers differing electrostatic properties.

The collected and optionally cleaned PET composition pellets can be transported to a reducing apparatus 20, typically by a transport fluid, and reduced in size to sufficiently small particles for subsequent treatment. The lightweight reduced particles can be transported for purification at 24 using fluid flow, vacuum assistance, or other suitable method.

The reduced PET particles can be heated at 26 to a temperature above the melting point, or glass transition temperature, of PET. Typically, the reduced PET particles are heated to at least 260° C. The PET melt can then undergo degassing at 28 with the application of vacuum.

After the PET composition has been heated and degassed, the resulting recovered polymer can optionally be tested in order to evaluate whether or not the recovered composition can meet the criteria or specifications for reuse in forming expandable pellets, as shown at 37 in scheme 10 of FIG. 1.

After purification treatment 24, and optionally testing, the at least partially purified polymer composition is collected at 34.

B. Recovery of an Expanded Polymer Composition Incorporating a Chemical Blowing Agent This section describes steps of an illustrative method for at least partially purifying an expanded polymer composition that incorporates residual chemical blowing agents or lubricating agents, and optionally one or more volatile physical blowing agents.

Figure 3:
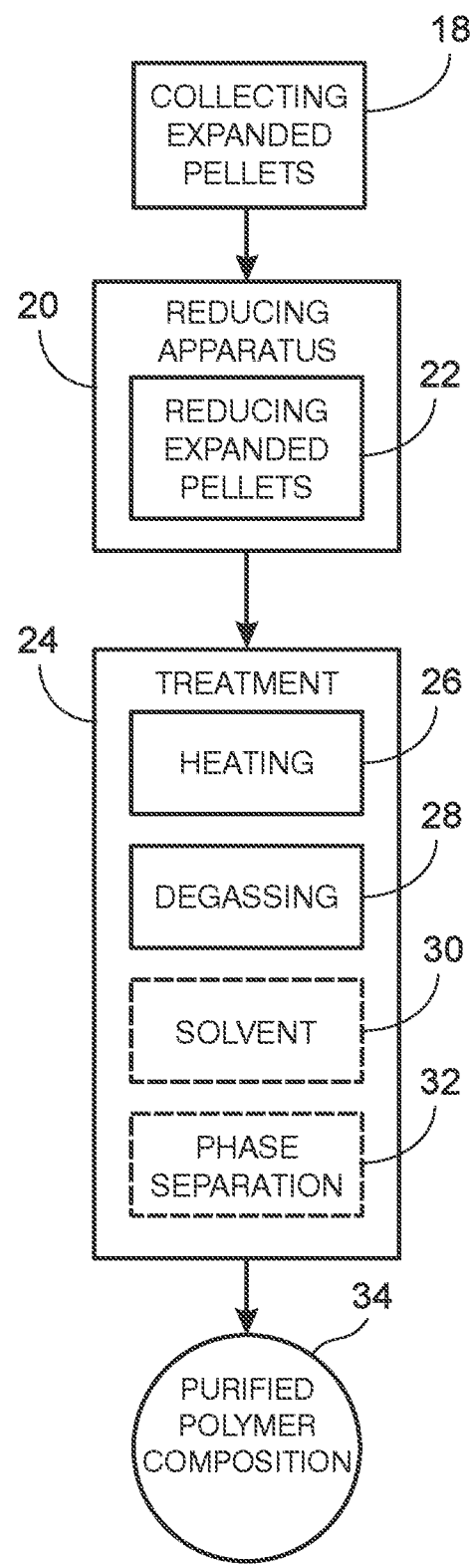
FIG. 3 is a schematic diagram depicting steps of an illustrative recovery process for selected polymer compositions used in expanding tooling.

As shown in FIG. 3, once the polymer pellets have been used in tooling manufacture, the now expanded polymer pellets can be collected, at 18, for recovery of their polymer composition.

The collected and expanded polymer composition pellets are transported to a reducing apparatus 20, typically by a transport fluid, and reduced in size to sufficiently small particles for subsequent treatment.

As indicated at 22 of FIG. 2, the reduced polymer particles are subjected to purification treatment 24 that include heating 26 to soften or melt the polymer composition, and degassing 28 to remove any volatile physical blowing agent present. Additionally, the polymer composition can be treated with an appropriate solvent at 30 and/or purified by phase separation at 32 in order to at least partially remove chemical blowing agent and optionally foaming agent.

After purification treatment 24, the at least partially purified polymer composition is collected at 34.

C. Illustrative Method for Recycling an Expanded Polymer Composition

Figure 4:
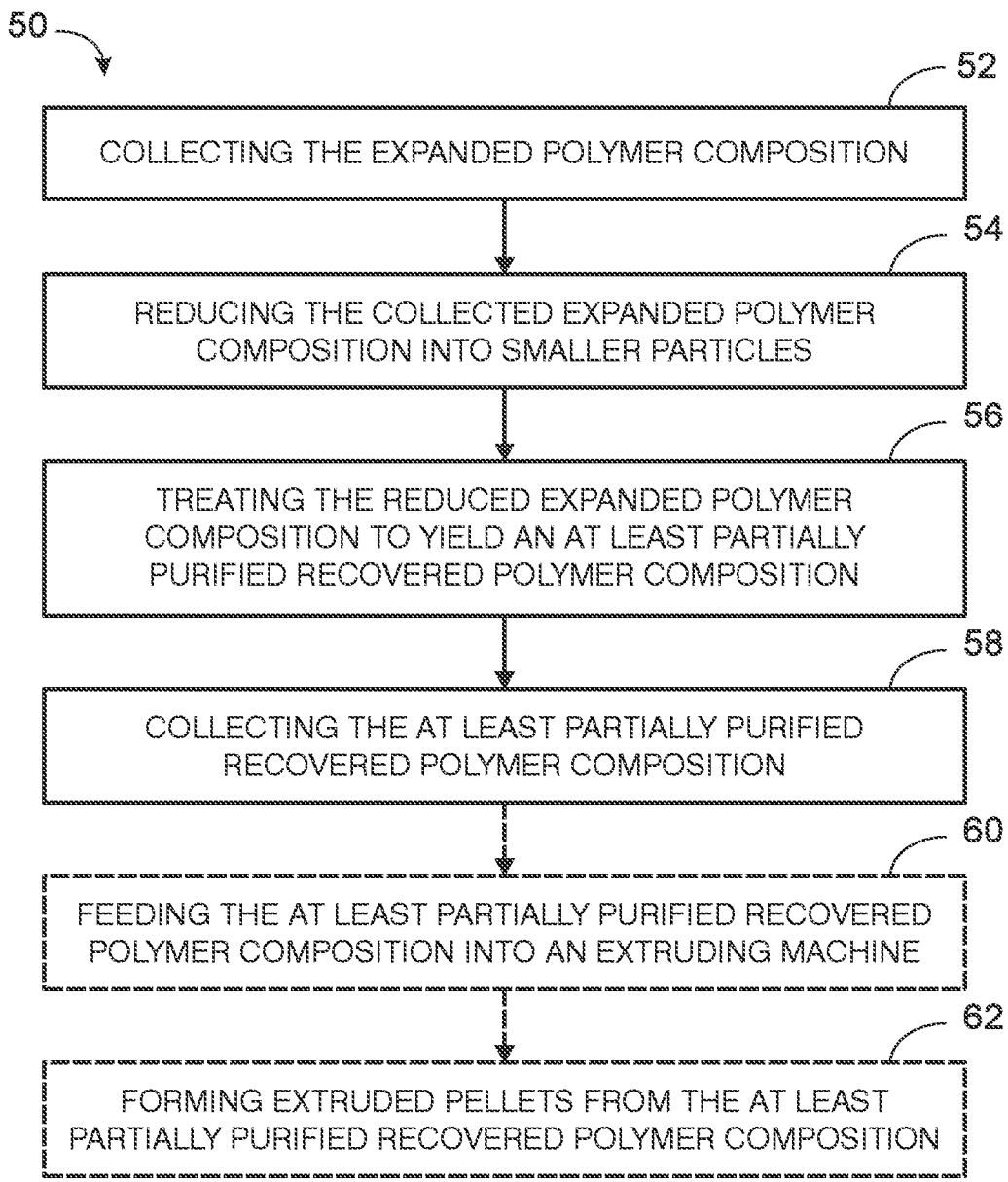
FIG. 4 is a flowchart depicting steps of an illustrative method for recycling an expanded polymer composition.

This section describes steps of an illustrative method for recycling an expanded polymer composition, as shown in flowchart 50 of FIG. 4.

Polymer compositions used to form expandable pellets can be recovered after the pellets have been expanded using the method steps described below. Where appropriate, reference can be made to components and systems that can be used in carrying out each step. These references are for illustration, and are not intended to limit the possible ways of carrying out any particular step of the method.

FIG. 4 includes a flowchart illustrating steps performed in an illustrative method. Based on the present disclosure, it should be understood that additional steps can be performed, without departing from the present claims. Although various steps of flowchart 50 are described below and depicted in FIG. 4, the steps need not necessarily all be performed, and in some cases can be performed simultaneously or in a different order than the order shown.

The illustrative method of flowchart 50 can include collecting the expanded polymer composition, as set out at step 52 of flowchart 50; reducing the collected expanded polymer composition into smaller particles, as set out at step 54 of flowchart 50; treating the reduced expanded polymer composition to yield an at least partially purified recovered polymer composition, as set out at step 56 of flowchart 50; and collecting the at least partially purified recovered polymer composition, as set out at step 58 of flowchart 50.

Reducing the collected expanded polymer composition into smaller particles, as set out at step 54 of flowchart 50, can optionally include moving the collected expanded polymer composition into a reducing apparatus using a directed fluid flow. For example, the directed fluid flow may be facilitated by an applied vacuum. Alternatively, or in addition, moving the collected expanded polymer composition into the reducing apparatus can include moving the collected expanded polymer composition into the grinding apparatus using a compressed gas.

Treating the reduced expanded polymer composition to yield an at least partially purified polymer composition, as set out at step 56 of flowchart 50, can include heating the reduced expanded polymer composition. Alternatively, or in addition, treating the reduced polymer composition to yield an at least partially purified recovered polymer composition can include degassing the reduced expanded polymer composition. Alternatively, or in addition, treating the reduced expanded polymer composition to yield an at least partially purified recovered polymer composition can include treating the reduced expanded polymer composition with a solvent. Alternatively, or in addition, treating the reduced expanded polymer composition with a solvent can include subjecting the resulting mixture to a phase separation in order to remove one or more foaming agents from the polymer composition.

The method for recycling an expanded polymer composition of flowchart 50 can optionally further include feeding the at least partially purified recovered polymer composition into an extruding machine, as shown at step 60 of flowchart 50. Optionally and additionally, the method can further include forming extruded pellets from the at least partially purified recovered polymer composition, as shown at step 62 of flowchart 50. Where the at least partially purified recovered polymer composition is used to form extruded pellets, forming such extruded pellets may optionally include adding one or more blowing agents to the at least partially purified recovered polymer composition.

D. Illustrative Method for Recycling Expandable Tooling

Figure 5:
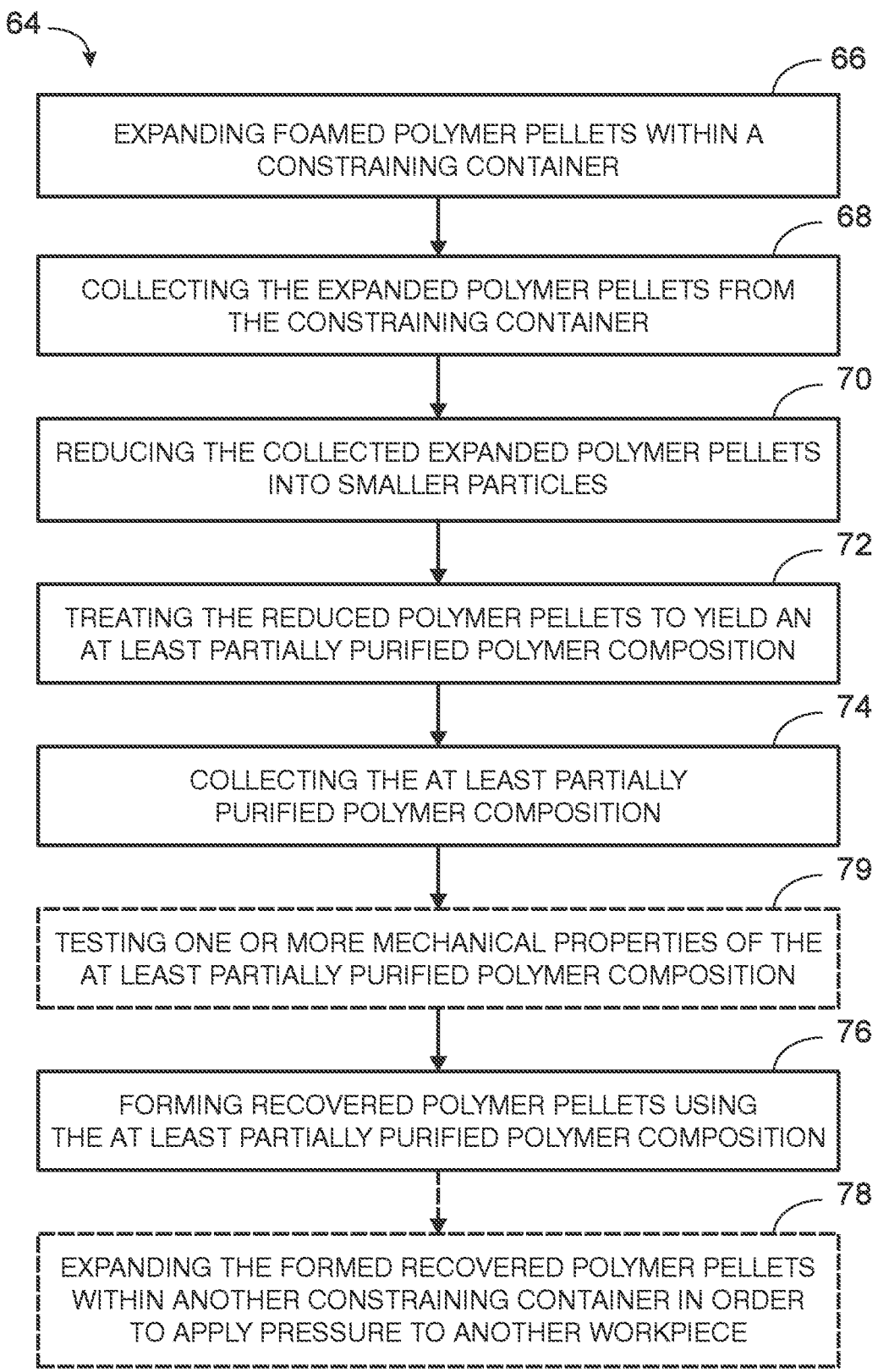
FIG. 5 is a flowchart depicting steps of an illustrative method for recycling expandable tooling.

This section describes steps of an illustrative method for recycling expandable tooling, where the tooling includes foamed polymer pellets, as shown in flowchart 64 of FIG. 5.

The illustrative method of flowchart 64 can include expanding the foamed polymer pellets within a constraining container in order to apply pressure to a workpiece, as set out at step 66 of flowchart 64; collecting the expanded polymer pellets from the constraining container, as set out at step 68 of flowchart 64; reducing the collected expanded polymer pellets into smaller particles, as set out at step 70 of flowchart 64; treating the reduced polymer pellets to yield an at least partially purified polymer composition, as set out at step 72 of flowchart 64; collecting the at least partially purified polymer composition, as set out at step 74 of flowchart 64; and forming recovered-polymer pellets using the at least partially purified polymer composition, as set out at step 76 of flowchart 64.

Treating the reduced polymer pellets to yield an at least partially purified polymer composition, as set out at step 72, can include removing an amount of a foaming agent from the reduced polymer pellets.

Forming the recovered-polymer pellets using the at least partially purified polymer composition, as set out at step 76, can include adding one or more foaming agents to the at least partially purified polymer composition. Alternatively, or in addition, forming the recovered-polymer pellets using the at least partially purified polymer composition can include an addition of a virgin polymer composition to the at least partially purified polymer composition.

The method of flowchart 64 can optionally further include expanding the recovered-polymer pellets formed in step 76 within another constraining container in order to apply pressure to another workpiece, as set out at step 78 of flowchart 64.

The method of flowchart 64 can optionally further include testing one or more mechanical properties of the at least partially purified polymer composition, as set out at step 79 of flowchart 64.

E. Illustrative Method for Recycling Expandable Tooling

Figure 6:
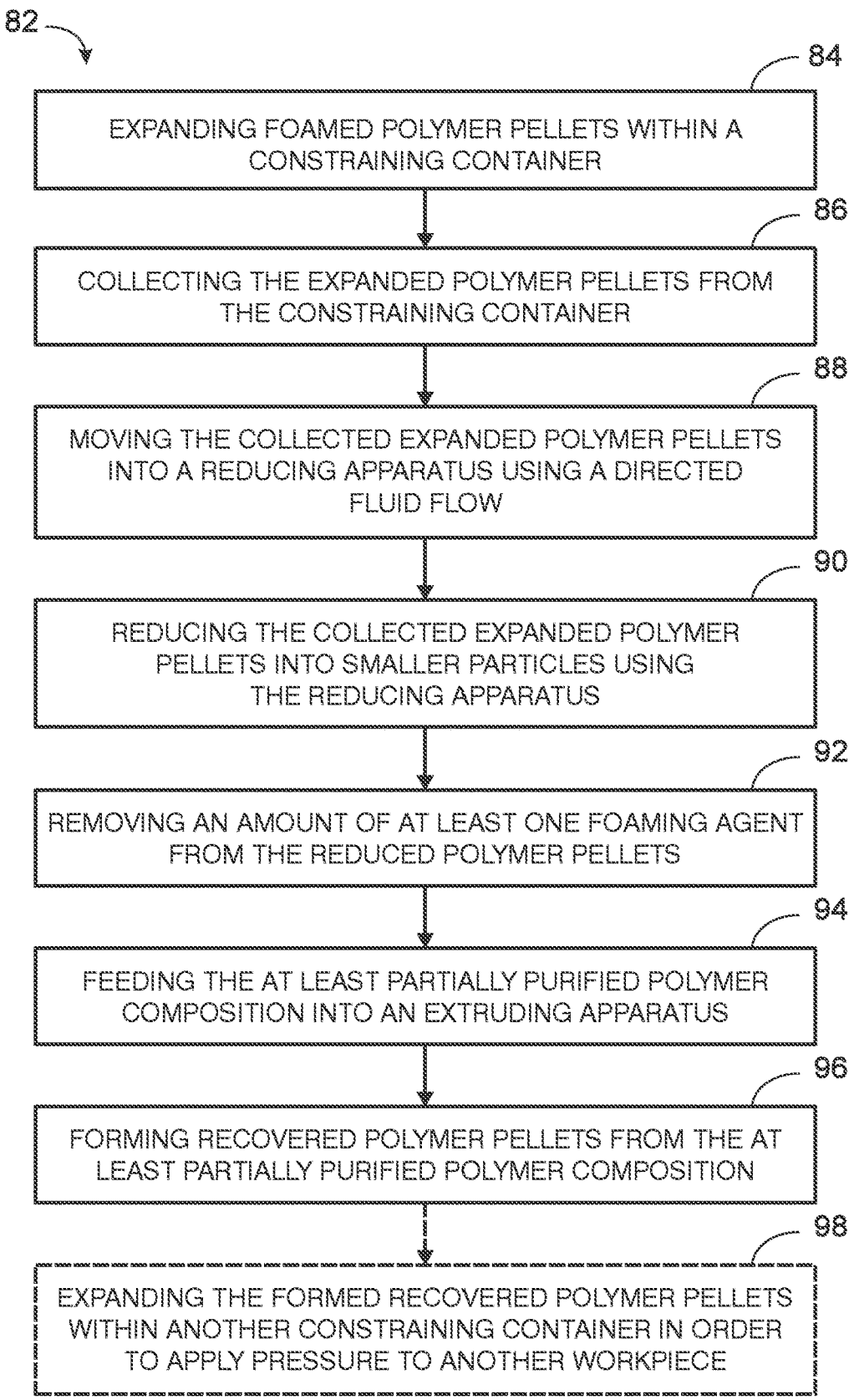
FIG. 6 is a flowchart depicting steps of an alternative illustrative method for recycling expandable tooling.

This section describes steps of an illustrative method for recycling expandable tooling, where the tooling includes foamed polymer pellets, as shown in flowchart 82 of FIG. 6.

The illustrative method of flowchart 82 can include expanding the expandable polymer pellets within a constraining container to apply pressure to a workpiece, as set out at step 84 of flowchart 82; collecting the expanded polymer pellets from the constraining container, as set out at step 86 of flowchart 82; moving the collected expanded pellets into a reducing apparatus using a directed fluid flow, as set out at step 88 of flowchart 82; reducing the collected expanded polymer pellets into smaller particles using the reducing apparatus, as set out at step 90 of flowchart 82; removing an amount of at least one foaming agent from the reduced polymer pellets by one or more processes of heating, degassing, solvent cleaning, and phase separation to yield an at least partially purified polymer composition, as set out at step 92 of flowchart 82; feeding the at least partially purified polymer composition into an extruding apparatus, as set out at step 94 of flowchart 82; and forming recovered-polymer pellets from the at least partially purified polymer composition, as set out at step 96 of flowchart 82.

Forming the recovered-polymer pellets from the at least partially purified polymer composition, as set out at step 96 of flowchart 82, optionally includes adding one or more chemical or physical blowing agents to the at least partially purified polymer composition.

Feeding the at least partially purified polymer composition into an extruding apparatus, as set out at step 94 of flowchart 82, optionally further includes adding an amount of a virgin polymer composition to the at least partially purified polymer composition.

The method of flowchart 82 can optionally further include expanding the recovered-polymer pellets formed as set out in step 96 within another constraining container in order to apply pressure to another workpiece, as set out at step 98 of flowchart 82.

F. Illustrative Combinations and Additional Examples

This section describes additional aspects and features of the methods of recycling polymer compositions from expanded tooling, presented without limitation as a series of paragraphs, some or all of which can be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A method for recycling an expanded polymer composition, comprising: collecting the expanded polymer composition; reducing the collected expanded polymer composition into smaller particles; treating the reduced expanded polymer composition to yield an at least partially purified recovered polymer composition; and collecting the at least partially purified recovered polymer composition.

A2. The method of paragraph A1, wherein reducing the collected expanded polymer composition into smaller particles includes moving the collected expanded polymer composition into a reducing apparatus using a directed fluid flow.

A3. The method of paragraph A2, wherein the collected expanded polymer composition is moved into the reducing apparatus by an applied vacuum.

A4. The method of paragraph A2, wherein the collected expanded polymer composition is moved into the grinding apparatus by a compressed gas.

A5. The method of paragraph A1, wherein the step of treating the reduced expanded polymer composition to yield an at least partially purified polymer composition includes heating the reduced expanded polymer composition.

A6. The method of paragraph A5, wherein the step of treating the reduced polymer composition to yield an at least partially purified recovered polymer composition includes degassing the reduced expanded polymer composition.

A7. The method of paragraph A1, wherein the step of treating the reduced expanded polymer composition to yield an at least partially purified recovered polymer composition includes treating the reduced expanded polymer composition with a solvent.

A8. The method of paragraph A7, wherein treating the reduced expanded polymer composition with a solvent includes subjecting the reduced expanded polymer composition to a phase separation in order to remove one or more foaming agents from the polymer composition.

A9. The method of paragraph A1, further comprising feeding the at least partially purified recovered polymer composition into an extruding machine.

A10. The method of paragraph A9, further comprising forming extruded pellets from the at least partially purified recovered polymer composition.

A11. The method of paragraph A10, where forming extruded pellets from the at least partially purified recovered polymer composition includes adding one or more blowing agents to the at least partially purified recovered polymer composition.

B1. A method for recycling expandable tooling, where the tooling includes foamed polymer pellets; comprising: expanding the foamed polymer pellets within a constraining container in order to apply pressure to a workpiece; collecting the expanded polymer pellets from the constraining container; reducing the collected expanded polymer pellets into smaller particles; treating the reduced polymer pellets to yield an at least partially purified polymer composition; collecting the at least partially purified polymer composition; and forming recovered-polymer pellets using the at least partially purified polymer composition.

B2. The method of paragraph B1, wherein treating the reduced polymer pellets to yield an at least partially purified polymer composition includes removing an amount of a foaming agent from the reduced polymer pellets.

B3. The method of paragraph B1, wherein forming recovered-polymer pellets using the at least partially purified polymer composition includes adding one or more foaming agents to the at least partially purified polymer composition.

B4. The method of paragraph B1, wherein forming recovered-polymer pellets using the at least partially purified polymer composition includes an addition of a virgin polymer composition to the at least partially purified polymer composition.

B5. The method of paragraph B1, further comprising expanding the formed recovered-polymer pellets within another constraining container in order to apply pressure to another workpiece.

B6. The method of paragraph B1, further comprising testing one or more mechanical properties of the collected at least partially purified polymer composition.

C1. A method for recycling expandable tooling, where the tooling includes expandable polymer pellets; comprising: expanding the expandable polymer pellets within a constraining container to apply pressure to a workpiece; collecting the expanded polymer pellets from the constraining container; moving the collected expanded pellets into a reducing apparatus using a directed fluid flow; reducing the collected expanded polymer pellets into smaller particles using the reducing apparatus; removing an amount of at least one foaming agent from the reduced polymer pellets by one or more processes of heating, degassing, solvent cleaning, and phase separation to yield an at least partially purified polymer composition; feeding the at least partially purified polymer composition into an extruding apparatus; and forming recovered-polymer pellets from the at least partially purified polymer composition.

C2. The method of paragraph C1, wherein forming recovered-polymer pellets from the at least partially purified polymer composition includes adding one or more chemical or physical blowing agents to the at least partially purified polymer composition.

C3. The method of paragraph C1, wherein feeding the at least partially purified polymer composition into an extruding apparatus further comprises adding a virgin polymer composition to the at least partially purified polymer composition.

C4. The method of paragraph C1, wherein the formed recovered-polymer pellets are expanded within another constraining container to apply pressure to another workpiece.

Advantages, Features, and Benefits

The methods of recycling and/or recovering polymer compositions from expandable tooling described herein enable the fabrication of composite materials at significant cost savings, as the cost of the materials used for expandable tooling is reduced, the cost of fabricating the expandable tooling is reduced, and the cost of disposal of resulting waste materials is reduced.

The instant methods permit the polymer compositions used to prepare expandable tooling to be at least partially purified and reused in an economical fashion. Such reuse greatly reduces the amount of polymer composition that must be disposed of in an environmentally appropriate manner, including the cost of transporting the used materials In this way, landfill use is reduced, and environment sustainability is increased.

Where the polymer composition recovery and/or reuse processes can be carried out onsite, the many advantages of out-of-autoclave manufacturing techniques can be amplified, as the tooling is used, recovered, reformed, and reused in one location, avoiding delays and bottlenecks often associated with just-in-time inventory management, and unexpected delivery delays.

The reuse of the polymer composition additionally reduces the cost of preparing new expandable tooling, as less newly synthesized polymer is required to prepare the desired tooling. Alternatively, or in addition, one or more aspects of the recovery and reuse of the polymer compositions used for expandable tooling can be contracted to specialized outside service providers, who can then compete to perform one or more aspects of recycling, reuse, and reforming of the expandable tooling at lower cost.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method for recycling an expanded polymer composition, comprising:
   collecting the expanded polymer composition;
   reducing the collected expanded polymer composition into smaller particles;
   treating the reduced expanded polymer composition to yield an at least partially purified recovered polymer composition, including:
     softening or dissolving the reduced expanded polymer composition with a nonpolar solvent, and
     subsequently treating the reduced expanded polymer composition with a polar solvent in order to remove one or more foaming agents from the polymer composition; and
   collecting the at least partially purified recovered polymer composition.

2. The method of claim 1, wherein reducing the collected expanded polymer composition into smaller particles includes moving the collected expanded polymer composition into a reducing apparatus using a directed fluid flow.

3. The method of claim 2, wherein the collected expanded polymer composition is moved into the reducing apparatus by an applied vacuum.

4. The method of claim 1, wherein the step of treating the reduced expanded polymer composition to yield an at least partially purified polymer composition includes heating the reduced expanded polymer composition.

5. The method of claim 4, wherein the step of treating the reduced polymer composition to yield an at least partially purified recovered polymer composition includes degassing the reduced expanded polymer composition.

6. The method of claim 1, further comprising feeding the at least partially purified recovered polymer composition into an extruding machine.

7. The method of claim 6, further comprising forming extruded pellets from the at least partially purified recovered polymer composition.

8. The method of claim 7, where forming extruded pellets from the at least partially purified recovered polymer composition includes adding one or more blowing agents to the at least partially purified recovered polymer composition.

9. The method of claim 1, further comprising:
   testing one or more mechanical properties of the collected at least partially purified recovered polymer composition, and
   in response to a failure of one of the tested mechanical properties failing to meet established criteria, modifying the recovered polymer composition by adding one or both of (a) a polymer chain-extending additive, (b) virgin polymer composition.

10. The method of claim 9, wherein testing one or more mechanical properties includes measuring an elongation at break of the at least partially purified recovered polymer composition.

11. The method of claim 1, wherein the reduced expanded polymer composition is treated with the polar solvent also in order to remove one or both of (a) an unreacted chemical blowing agent, (b) reaction products of the reaction of a chemical blowing agent.

12. The method of claim 1, wherein the one or more foaming agents include a surfactant.

* * * * *